Sept. 15, 1942.    E. N. FRIDGEN    2,295,990

PIEZO ELECTRIC CRYSTAL HOLDER

Filed Oct. 13, 1941

INVENTOR
EDWARD N. FRIDGEN
BY
*Carl E. Ring*
ATTORNEY

Patented Sept. 15, 1942

2,295,990

UNITED STATES PATENT OFFICE 2,295,990

PIEZOELECTRIC CRYSTAL HOLDER

Edward N. Fridgen, Harrisburg, Pa., assignor, by mesne assignments, to Alvie Briton Hendricks, Mill Hall, Pa.

Application October 13, 1941, Serial No. 414,709

6 Claims. (Cl. 171—327)

This invention relates to piezo-electric devices and is more particularly concerned with an improved piezo-electric crystal holder.

It is an object of this invention to provide a piezo-electric crystal holder for an oscillator which can afford a mounting for use in any position and one which at the same time is not affected by temperature or atmospheric conditions, or by conditions caused by use such as jolts, jars and vibrations. The holder of this invention provides a means for mounting the crystal in a standard crystal-holder in such a manner that the crystal is simple to prepare and manufacture and may be completed without the expenditure of a large amount of time and money and without a large investment in equipment.

In the past, most crystal holders for piezoelectric purposes have not protected the crystal from vibrations or sudden jars or from humidity when in use. Where the crystal oscillator is mounted in a moving vehicle or object subject to vibration or sudden movement, the jars or vibrations are likely to cause change in frequencies by changing the position of the electrodes in association with the crystal or even to break the crystal. In the same way crystal operation may be affected by temperature or atmospheric changes, and its efficiency has been reduced by any such changes in conditions. Variation in the frequency is likely to be caused by these conditions, and any such changes or variations are especially detrimental when employed at higher frequencies.

It is well known that the vibration rate of a crystal is dependent upon thickness and stability of electrode position. In addition it is known that where a piezo-electric crystal is in operation in a temperature below freezing, ice may form on the electrodes and the efficiency of operation of the crystal will be adversely affected. In the same way, moisture on the electrodes or the crystal slab may adversely affect the operation of a piezo-electric crystal oscillator. It is one of the objects of this invention to provide a holder in which the crystal and the electrodes are protected from these conditions.

For a better understanding of the invention, reference is made to the drawing in which.

Figure 1:
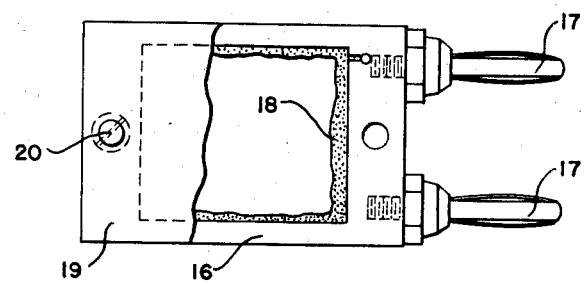
Figure 1 is a plan view with parts broken away showing the crystal holder.
Figure 2:
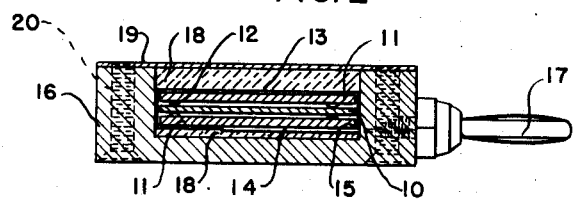
Figure 2 is a side elevational view partly in section of the crystal holder.
Figure 3:
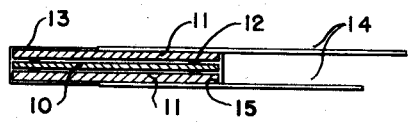
Figure 3 is a view of a detail.
Figure 4:
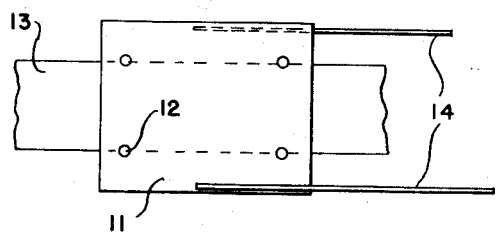
Figure 4 is another view of a detail.

In the form of the holder shown in the drawing, the crystal element 10 is mounted in spaced position between a pair of electrodes 11. In order to maintain the electrodes in spaced position, feet 12, or offsets, are pressed into the surfaces of the electrodes, preferably at points near the outer edges of said electrodes, in such a manner as to extend from the surface of the electrode from one one-thousandth to fifteen ten-thousandths of an inch. This provides for an air gap on each side of the quartz element, and thus aids in maximum efficiency in operation of the element. The quartz element is then mounted between the two electrodes having the feet 12 facing the crystal, and the quartz element is thus maintained at a fixed distance from the surface of the electrodes as shown in Figure 3. After the quartz element and the electrodes have been ground to the desired frequency and tested for tmeperature coefficients, activity, etc., they are secured together by wrapping a sealing material 13, which is wrapped lengthwise the electrodes as shown in Figure 4. The crystal element and the electrodes are thus secured as a unit, so that a connector 14 may be fixed to each of the electrodes, preferably by soldering, as shown in Figure 2. Having fixed the connectors in place, the whole unit is then wrapped by the covering sealing material 13 such as Cellophane, cellulose tape, or other non-conducting material which will adhere tightly to the electrodes in such a manner as to provide one or two small openings 15 in the covering 13, in order that any air or moisture may be forced out. The unit is then heated to a temperature of not more than 90° C. and any moisture or air there present is forced out through said openings 15. The openings are then sealed up and the unit is ready for mounting in the container 16. The connectors are secured to the terminal plugs 17 and molten sealing wax or other similar plastic material 18 is poured around and over the unit, to secure the unit to the container and to insure a perfect seal for the unit. After the sealing material has cooled and hardened, the cover 19 is placed in position on the holder and is held in place by the screws 20.

In this form the crystal oscillator may be plugged in any desired position, or may be quickly and easily changed or removed. The crystal unit may be operated under any atmospheric conditions and moisture and heat or cold will have a minimum effect on the efficiency of the operation. Tests have been made of an oscillator so prepared by immersing the whole holder in water for a period of thirty minutes, and it was found that moisture did not penetrate the crystal unit. In the same way, salt spray has been found to have no effect on the operation of this oscillator. Similarly the oscillator so constructed has been subjected to temperatures as low as 40° below zero, centigrade, without any change in the operation of the crystal. A standard crystal and holder when subjected to such freezing temperature will be adversely affected in its operation due to ice formation on the electrodes. Similarly when subjected to higher temperatures as high as 70° C., no ill effects were noted on the frequency or activity.

In the general use of crystal oscillators, they are subjected to a great deal of vibrations and sudden jars, and in many cases a sudden jar or vibration will change the operation of the unit by causing a change in the position of the electrodes in relationship to the crystal element. The holder of this invention will withstand jars or vibrations without any loss of efficiency, and by tests made on the device, a drop of ten feet upon a hard surface, although repeated ten or more times, failed to indicate any changes in the operation. This feature in the construction of the holder is especially important where the device will be employed in vehicles such as planes, tanks, trucks, etc.

Since the holder of this invention has plug-in terminals it may be used in any position or may be removed or changed quickly and easily without any delay to interrupt service in which it is being employed.

I claim:

1. A holder for a piezoelectric crystal resonator, comprising a holder, a crystal element spaced between a pair of electrodes and connectors on the electrodes, said crystal and the electrodes being hermetically sealed together, and secured in a fixed position in the holder.

2. A holder for a piezoelectric crystal resonator, comprising an element of crystal spaced between a pair of metallic electrodes, said crystal and the electrodes being enclosed within a moisture-proof covering, connectors on the electrodes, the electrodes and the crystal within the sealed covering being secured in a holder by means of a sealing and cushioning material.

3. A holder for a piezoelectrical crystal resonator comprising an element of crystal spaced between a pair of metallic electrodes, the spacing of the electrodes being by means of a plurality of feet pressed into the electrodes and protruding from the sides next to the crystal, the crystal and the electrodes being hermetically sealed within an envelope, and being secured in a fixed position in the holder.

4. A piezoelectric crystal holder comprising a crystal element spaced between a pair of electrodes, said element and the electrodes being hermetically sealed within an envelope, and being secured in a holder having a plurality of terminal plugs, the electrodes and the terminal plugs being connected.

5. A method of mounting a piezoelectric crystal in a holder comprising the spacing of a crystal element between a pair of electrodes, enclosing the crystal element and the electrodes within an envelope of sealing material, heating the envelope to a temperature of not more than 90° C. for expelling the air and moisture within said envelope, hermetically sealing said envelope, and securing the envelope within the holder by applying a fluid sealing material.

6. The method of mounting a piezoelectric crystal in a holder comprising the mounting of a crystal element between spaced electrodes, affixing connectors to the electrodes, enclosing the crystal element and the electrodes within an envelope for sealing, heating said envelope to expel the air and moisture within, sealing said envelope, and securing said envelope within the holder by means of a resilient sealing material, and affixing the connectors to the terminals of the holder.

EDWARD N. FRIDGEN.